L. IVERSEN.
VALVE FOR BLOWING ENGINES, &c.
APPLICATION FILED FEB. 18, 1914.
1,201,826.
Patented Oct. 17, 1916.
3 SHEETS—SHEET 1.
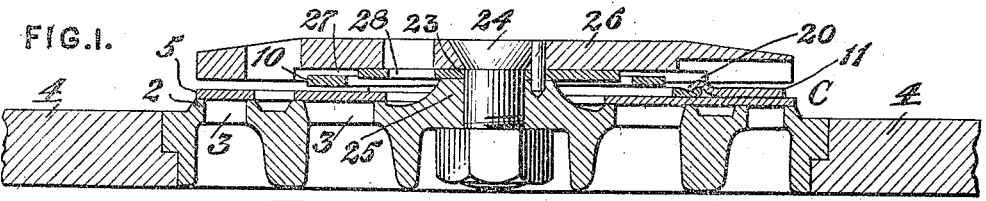
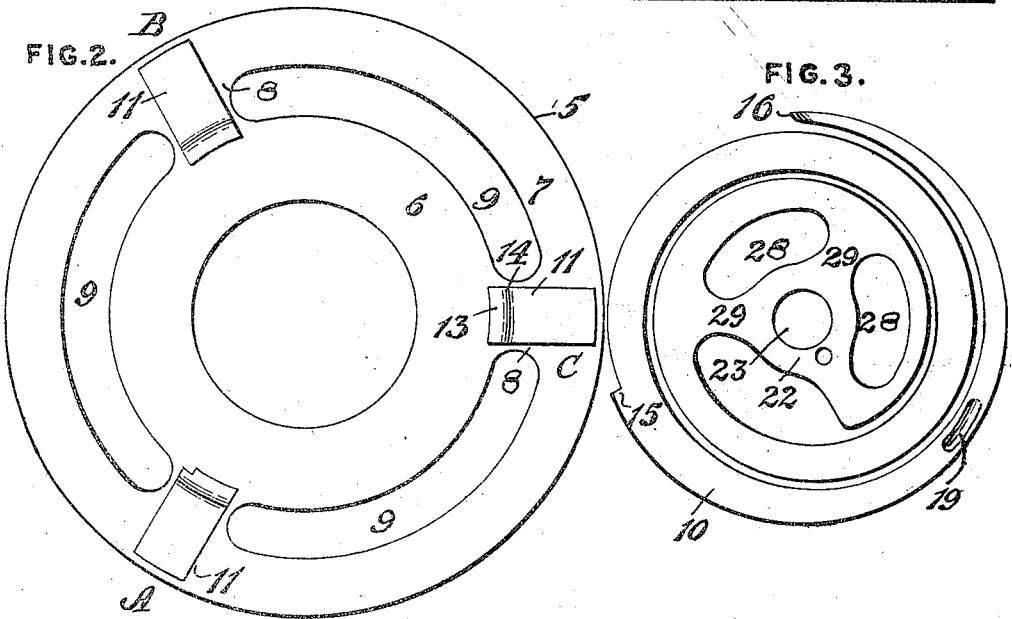
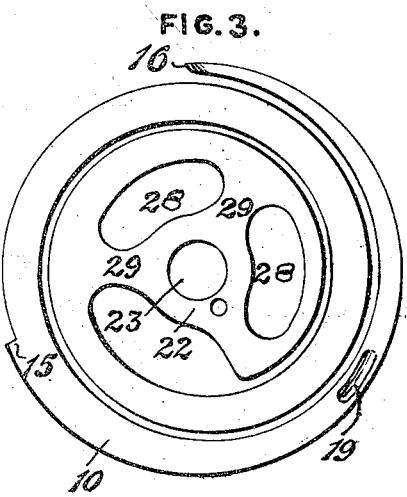
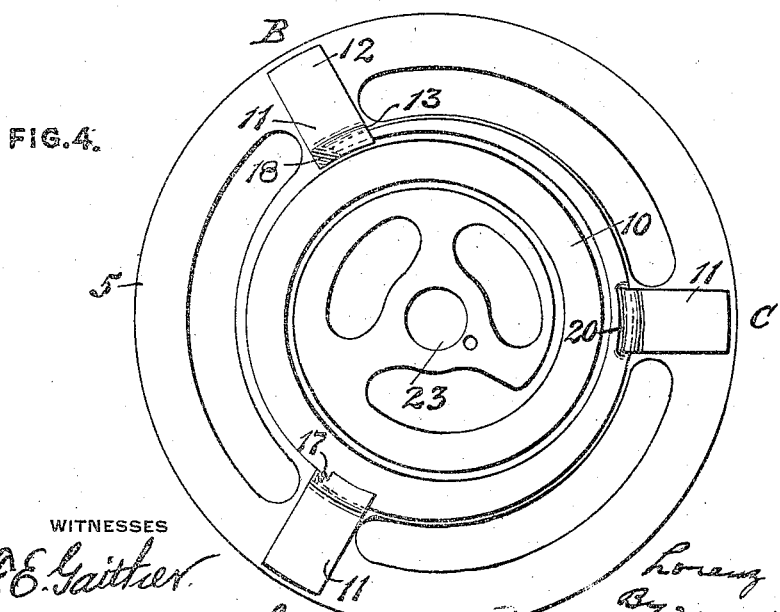
WITNESSES
INVENTOR
Lorenz Iversen

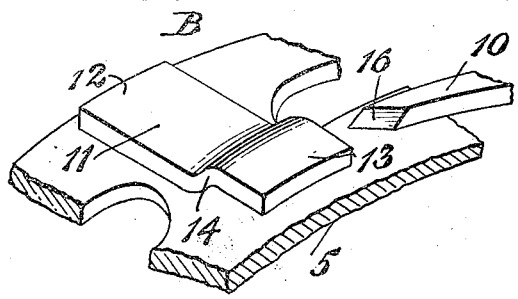
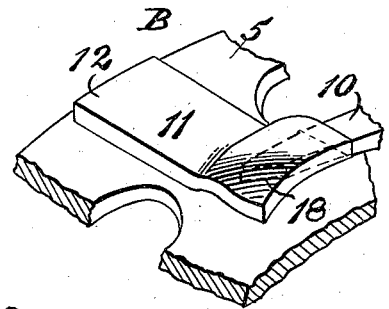
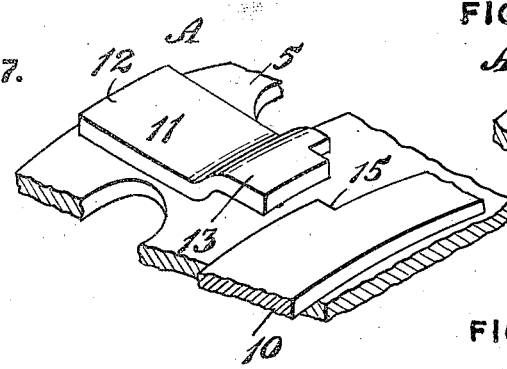
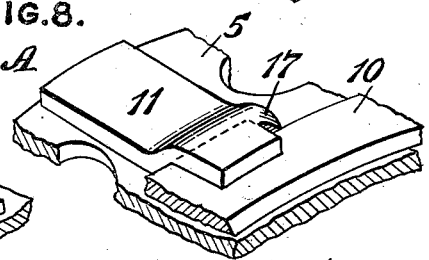
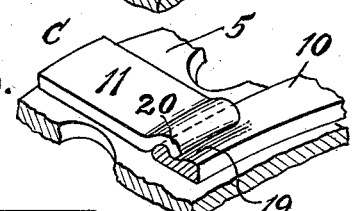
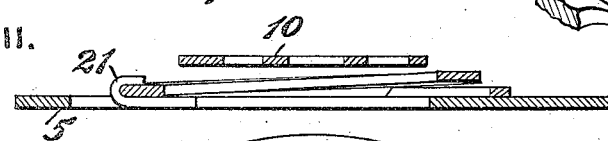
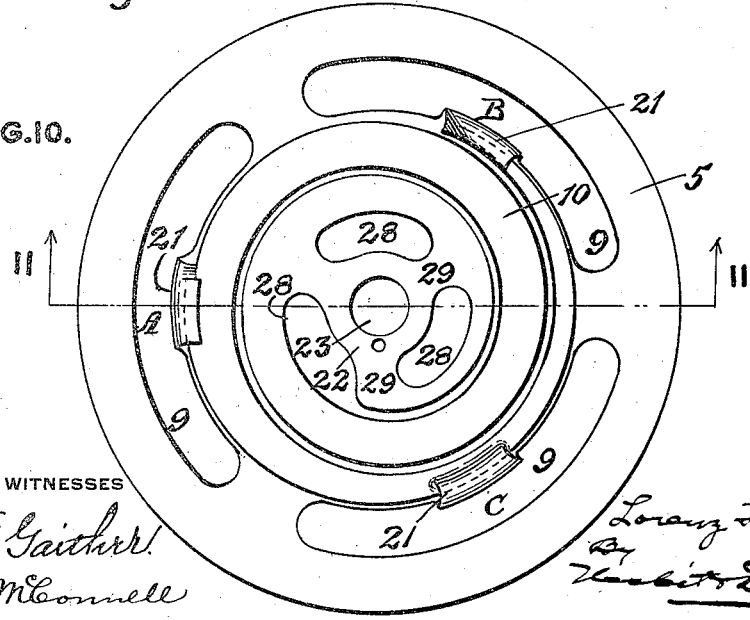

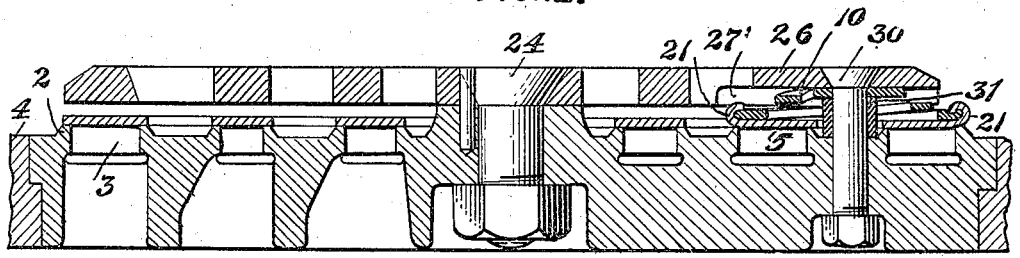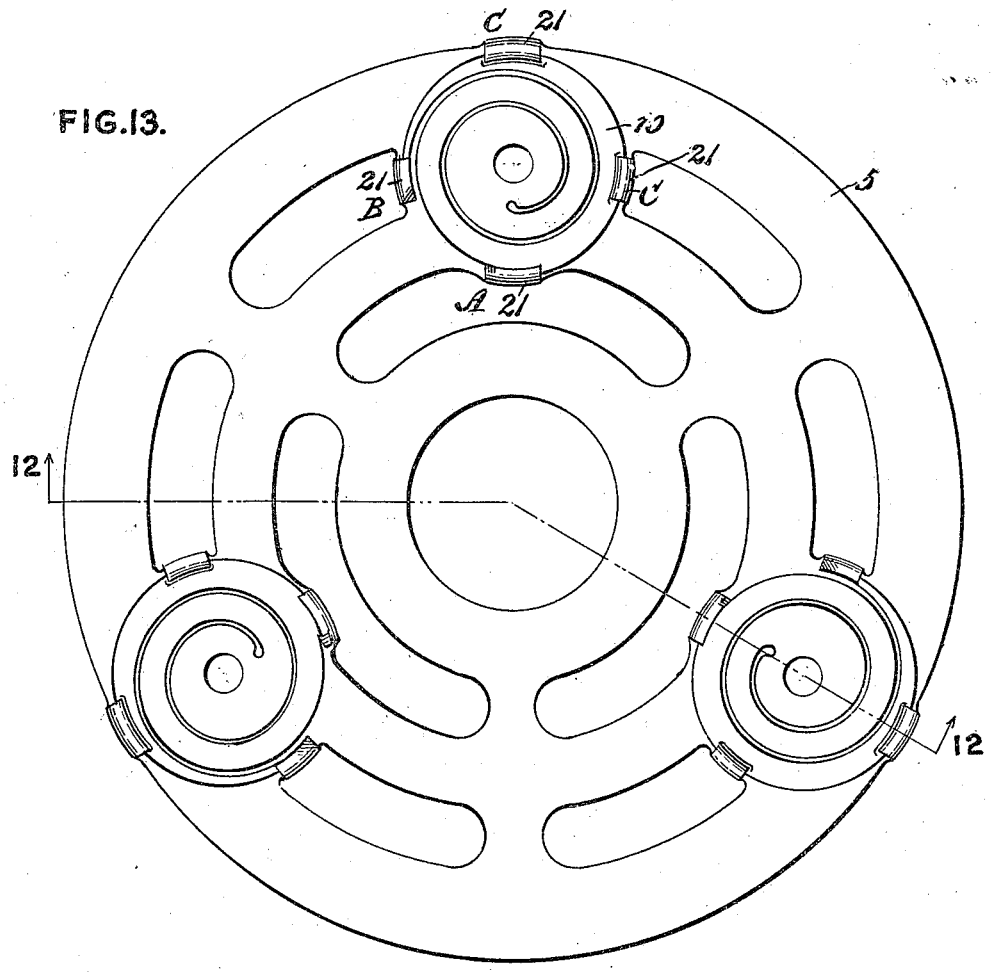

UNITED STATES PATENT OFFICE.

LORENZ IVERSEN, OF WEST HOMESTEAD, PENNSYLVANIA.

VALVE FOR BLOWING-ENGINES, &c.

1,201,826.    Specification of Letters Patent.    Patented Oct. 17, 1916.

Application filed February 18, 1914. Serial No. 819,465.

*To all whom it may concern:*

Be it known that I, LORENZ IVERSEN, a citizen of the United States, and a resident of West Homestead, in the county of Allegheny and State of Pennsylvania, have invented certain new and useful Improvements in Valves for Blowing-Engines, &c., of which the following is a specification.

This invention relates to valves for blowing engines, compressors, pumps, and other machines variously employed for manipulating gases and liquids, and has particular reference to certain improvements in the valve mechanism of Patent No. 1,012,359, granted to me December 19, 1911.

The primary object herein is to provide simple and efficient means for so uniting the valve and the valve-actuating spring or springs as to preclude independent movement of either of said parts, the securing means accurately defining the relative positions of the parts and permanently maintaining them therein, and with independent movement forestalled, wear resulting from friction developing movement of one part on the other is avoided.

In practice, a coiled spring of plate form is found preferable to the coiled wire spring disclosed in my former patent, as it provides greater lateral rigidity, without however impairing the necessary flexibility and elasticity longitudinally of the valve axis. Furthermore, it is highly desirable to prevent relative movement between the valve and that portion of the spring or springs to which the valve is secured, and as above indicated, it is to the accomplishment of this purpose that the present invention is primarily directed. In addition to the securing means, the invention includes certain improvements in the spring itself.

In the accompanying drawings, Figure 1 is a vertical section of a one-spring valve for a blowing engine or compressor constructed in accordance with the invention; Fig. 2 is a plan view of the valve proper; Fig. 3 is a like view of the valve-actuating spring, and Fig. 4 is a plan view of the valve and spring assembled. Figs. 5 and 6 are details on an enlarged scale, illustrating the interlocking connection between the extremity of the spring and the valve, and Figs. 7 and 8 are similarly enlarged views illustrating one of the intermediate connections, while Fig. 9 is a like view in detail of still another intermediate connection. Fig. 10 is a plan view of a valve and spring assembled, showing holding clips of different form, and Fig. 11 is a section, taken on line 11—11 of Fig. 10. Fig. 12 is a vertical section of a multiple spring adaptation, the plane of section of the valve being indicated by line 12—12 of Fig. 13. Fig. 13 is a top plan of the valve and springs assembled.

Referring to the drawings, 2 designates the valve seat which in the form illustrated is multiported at 3, the valve seat being fitted in head or wall 4 of the machine to which it is applied. Plate valve 5 is formed with the inner and outer ring portions 6 and 7 complementary with the valve seat ports, the two ring portions being connected by the webs or bridges 8 which separate the segmental valve ports 9. It will be understood, however, that the valve and valve seat may be variously ported, the form here shown being only one of various adaptations.

In the present invention, as in my above mentioned patent, the valve is spring supported and spring guided. The coiled spring 10 as here shown is of flat or plate form, rather than of the spring-wire form illustrated in my former patent, the plate form providing greater lateral rigidity and holding the valve accurately positioned relative to the valve seat without in any way interfering with its flexibility and elasticity longitudinally of the valve axis.

For accurately and fixedly uniting the valve and spring, precluding relative movement of the parts in any direction, an end convolution of the spring, preferably the larger end, is secured by clips carried by the valve. In the adaptation of Figs. 1, 2 and 4, the clips 11 are formed separate from the valve and are spaced apart at positions A, B and C. Each clip consists of a shank portion 12 which is secured by welding or otherwise to a web or bridge 8 of the valve, the inner portion 13 of the clip being deflected at 14 to overhang the spring and to form a socket for receiving and confining the same. The number of clips will vary in valves of different sizes, as will be understood. The clips are disposed radially with relation to the valve center with their socket-forming bends facing inwardly as shown. Spring 10 is formed with much precision, and with the clips accurately positioned on the valve with only sufficient space beneath heads 13 for the spring, the latter is slipped into place and is thereby at once very accurately located.

The outer periphery of the end convolution of spring 10 is formed with a shoulder or offset 15, and the extremity of this convolution is beveled at 16. The spring-holding clips are so spaced that with shoulder 15 beneath the clip at position A, the beveled extremity will be embraced by the clip at position B. With the spring thus located, the clip head 13 at position A is bent or inset at 17 to provide an abutment for shoulder 15, thereby preventing rotation of the spring beneath the clips in one direction. The clip head at position B is next bent or indented against the beveled extremity 16 of the spring as indicated at 18, thereby forcing the secured convolution of the spring in a circumferential direction with shoulder 15 bearing firmly against abutment 17, and this movement supplemented by the bevel of face 16 operates to hold the spring convolution pressed back or outwardly in positive engagement with the socket-forming clip offsets 14. As the clip at position A holds the spring against rotation in one direction and the clip at position B against rotation in the opposite direction, it will be seen that the spring is positively secured and held accurately positioned without possibility of displacement. The interlocking engagement of the clips with the spring at positions A and B accomplish this quite regardless of the hold of any intermediately positioned clips, although in practice the intermediate clip or clips here shown at one or more positions C are also preferably caused to interlock with the spring, the overlapping heads of these clips being upset into the surface depressions 19 formed in the spring, as indicated at 20, and such interlocking connection also tends to force the spring backwardly or outwardly against the socket-like bend or bends 14.

In the adaptation of Figs. 10 and 11, the clips are formed integral with the valve plate, being struck up from the inner ring 6, as indicated at 21. The interlocking engagement of these clips with the spring is the same as that above described.

In the arrangement shown in Fig. 1 wherein the valve is supported and guided by a single spring, the smaller plate-like end portion 22 of the latter is apertured centrally at 23 to pass the securing bolt 24, thereby clamping extremity portion 22 between the central portion 25 of seat 2 and the center of stop plate 26, the latter being properly spaced from the valve seat to permit of the necessary valve movement, the inner face of the stop being recessed at 27 to receive the contracted spring so that the valve will positively engage the stop. The webs or ribs 29 separating ports 28 coöperate in providing sufficient body for the spring end portion 22, affording the necessary strength and resisting lateral distorting tendencies without interfering with the flexibility and resiliency of the spring longitudinally of its axis. Stop 26 is ported as shown for the passage of air through the valve and spring ports. Although of flat metal or plate formation, the coiled spring of the present adaptation is characterized by the tapered form and the nesting of the spring convolutions peculiar to the spring shown and described in my former patent. Also in this adaptation as in that, the end convolutions of the spring are parallel in any and all positions of the valve so that all portions of the seating face of the valve always bear the same relation to the seat. While the invention is not restricted in the size or number of convolutions with which the spring is formed, it preferably has at least one complete free convolution intermediate its secured end portions.

A plurality of supporting and guiding springs may be employed, particularly for relatively large valves, a desirable arrangement thereof being illustrated in Figs. 12 and 13. In the multiple spring construction, each spring is secured to the valve in the manner hereinbefore described and as clearly illustrated in Fig. 13, each spring being thus held positively and accurately fixed to the valve, the lateral rigidity of the several springs maintaining the valve in proper relation to the valve seat. In the adaptation shown, the spring-holding clips of the multiple spring arrangement are struck up from the valve plate, as shown at 21, the same as in the form illustrated in Figs. 10 and 11. Bolts 30 which secure the outer portion of the stop plate 26 to the valve seat may be utilized for securing the several springs of the multiple spring construction. Each of these bolts extends through a passage in a rib of the valve seat and through a corresponding hole in the valve, and the spring is clamped in depression 27' in the under face of the stop by means of a sleeve 31 on bolt 30 which rests in a depression in the valve seat face, all as clearly shown in Fig. 12. Depression 27' provides ample space for the contracted spring so that the valve may flatly engage the stop when open.

In each of the adaptations here shown the valve is carried and guided wholly by the coiled spring or springs, features characteristic of the construction of my former patent, and as the improvements herein preclude independent movement of the spring or springs on the valve, and vice versa, the development of friction and the wear resulting therefrom are rendered impossible.

I claim:

1. The combination of a valve, devices carried by the valve and formed with integral projections, and a valve-actuating spring having offset surfaces adapted to interlock with the projections of said devices and hold the valve and the portion of the spring secured thereto against relative movement in any direction.

2. The combination of a valve, a valve-actuating spring having surface irregularities, and holding devices upset into interlocking engagement with the surface irregularities for fixedly uniting the valve and spring.

3. The combination of a valve, a circular valve-actuating spring, and spaced holding devices on the valve and between which an end convolution of the spring fits and with said devices in interlocking engagement with the spring for fixedly uniting the valve and spring.

4. The combination of a valve, spaced socket-forming holding devices on the valve, a circular spring entered in the sockets with portions of the holding devices interlocking with the spring for holding the latter fixed in the sockets.

5. The combination of a valve, spaced socket-forming holding devices on the valve with the sockets facing the axial center of the valve, a circular valve-actuating spring entered in the sockets, and means providing interlocking connections between the holding devices and the spring for fixedly uniting the valve and spring.

6. The combination of a valve, spaced socket-forming holding devices on the valve with the sockets facing the axial center of the valve, a coiled spring having an end convolution entered in the sockets, and means forming interlocking connections between said devices and the spring for holding the end convolution of the spring against circumferential and radial movement relatively to the valve.

7. The combination of a valve, spaced socket-forming holding devices on the valve with the sockets facing the axial center of the valve, a coiled valve-actuating spring having an end convolution entered in the sockets with the holding devices overhanging said convolution and with the overhanging portions upset into interlocking engagement with the spring for fixedly uniting the end convolution thereof and the valve.

8. The combination of a valve, a valve-actuating coiled spring having an end convolution formed with an offset, a holding device on the valve with the spring offset engaging the holding device for preventing relative circumferential movement of the spring and valve in one direction, and another holding device on the valve and engaging said end convolution of the spring for preventing relative circumferential movement in the opposite direction.

9. The combination of a valve, a valve-actuating coiled spring having an end convolution formed with an offset, a holding device on the valve with the spring offset engaging the holding device for preventing relative circumferential movement of the spring and valve in one direction, and another holding device on the valve and constituting an abutment for the extremity of said end convolution for preventing relative circumferential movement in the opposite direction.

10. The combination of a valve, a valve-actuating coiled spring having an end convolution formed with an offset, a holding device on the valve with the spring offset engaging the holding device for preventing relative circumferential movement of the spring and valve in one direction, the extremity of said end convolution having a beveled face, and another holding device on the valve and engaging said beveled face for exerting circumferential holding pressure on the end convolution in the direction of the abutment formed by the first named holding device.

11. The combination of a valve, a circular valve-actuating spring, and two spring-holding devices on the valve at the outer periphery of the spring and between which the spring is entered, one device holding the valve against circumferential movement in one direction and the other holding it against circumferential movement in the opposite direction.

12. The combination of a valve, a coiled valve-actuating spring having an end convolution in engagement with the valve, and two spring-holding devices on the valve at the outer periphery of the spring and, respectively, exerting holding force on the valve in opposite directions—one maintaining the valve and spring against relative circumferential movement in one direction and the other maintaining the same against circumferential movement in the opposite direction.

13. The combination of a valve, a circular tapered valve-actuating spring having nesting convolutions and means projecting from the valve at the outer periphery of the spring for holding the spring and valve against relative circumferential movement.

14. The combination of a valve, a valve-actuating spring of coil form having an end convolution in engagement with the valve, and a plurality of holding devices on the valve at the outer periphery of the spring and between which it is entered, said devices being in interlocking engagement with said end convolution for holding the valve and spring against relative circumferential movement.

15. The combination of a valve, a valve-actuating spring of coil form having an end convolution in engagement with the valve, and a plurality of spring-holding devices on the valve at the outer periphery of the spring and between which it is entered, one of said devices engaging and confining the extremity of said end convolution and another of said devices engaging the spring at a distance from said extremity.

16. The combination of a valve, a valve actuating spring of coil formation, and holding means located on the valve beyond the outer periphery of the spring and in interlocking engagement with the spring for holding it and the valve against relative circumferential movement.

17. The combination of a valve, a valve-holding plate spring of coil form having an end convolution rectangular in cross-section and formed with surface irregularities, and holding devices on the valve at the outer periphery of the spring and adapted to engage said irregularities for maintaining the spring and valve against relative circumferential movement.

18. The combination of a valve, a valve-actuating plate spring of coil form having an end convolution rectangular in cross-section, spaced socket-forming holding devices on the valve with the sockets facing the axial center of the valve, said end convolution of the spring entered in the sockets and the holding devices upset against said end convolution and holding the latter engaged with the back walls of the sockets.

19. The combination of a valve, a valve supporting and guiding plate spring of tapered coil form, means on the valve at the periphery of the spring and providing an immovable union between the valve and the larger end convolution of the spring, and supporting means to which the smaller end of the spring is secured.

20. The combination of a valve, a valve supporting and guiding plate spring of tapered coil form, means providing an immovable union between the valve and the larger end convolution of the spring, the smaller end of the spring formed with an aperture, and spring-sustaining means to which the spring is secured by means of said aperture.

21. The combination of a valve, a valve actuating coiled spring, and spring embracing clips formed separately from the valve and secured thereto beyond the outer periphery of the spring and adapted to engage the latter for securing it to the valve.

22. A tapered coiled spring for actuating and guiding a valve for blowing engines, etc., the spring formed of thin flat metal having nesting convolutions, the cross-section of the spring throughout its length being sufficient in direction at right angles to the spring axis to resist lateral deflection, one end convolution adapted to coöperate with a valve and the other end convolution with a support.

23. A tapered coiled spring for actuating and guiding a valve for blowing engines, etc., the spring formed of thin flat metal having nesting convolutions, the cross-section of the spring throughout its length being sufficient in direction at right angles to the spring axis to resist lateral deflection, the larger end convolution adapted to be secured to a valve and the other end convolution to a support.

In testimony whereof I affix my signature in presence of two witnesses.

LORENZ IVERSEN.

Witnesses:
J. M. NESBIT,
F. E. GAITHER.